US008905009B2

(12) United States Patent
Moritani et al.

(10) Patent No.: US 8,905,009 B2
(45) Date of Patent: Dec. 9, 2014

(54) LOW PRESSURE EXHAUST GAS RECIRCULATION APPARATUS

(75) Inventors: Yuichiro Moritani, Kariya (JP); Shinsuke Miyazaki, Chiryu (JP); Kazushi Sasaki, Obu (JP); Koji Hashimoto, Anjo (JP)

(73) Assignee: Denso Corporation, Kariya (JP)

( * ) Notice: Subject to any disclaimer, the term of this patent is extended or adjusted under 35 U.S.C. 154(b) by 303 days.

(21) Appl. No.: 13/454,176

(22) Filed: Apr. 24, 2012

(65) Prior Publication Data

US 2012/0272646 A1 Nov. 1, 2012

(30) Foreign Application Priority Data

Apr. 27, 2011 (JP) .................................. 2011-98847
Aug. 29, 2011 (JP) ................................. 2011-186262

(51) Int. Cl.
| | | |
|---|---|---|
| F02B 33/34 | (2006.01) | |
| F02D 41/22 | (2006.01) | |
| F02M 25/07 | (2006.01) | |
| F02B 29/04 | (2006.01) | |
| F02D 41/00 | (2006.01) | |

(52) U.S. Cl.
CPC .......... *F02D 41/221* (2013.01); *F02M 25/0728* (2013.01); *F02M 25/0718* (2013.01); *F02B 29/0406* (2013.01); *Y02T 10/47* (2013.01); *F02M 25/0709* (2013.01); *F02D 2041/0017* (2013.01); *F02M 25/0732* (2013.01); *F02M 25/0793* (2013.01); *F02M 25/0713* (2013.01); *F02D 2200/0404* (2013.01); *F02M 25/0786* (2013.01); *F02M 25/0707* (2013.01); *F02M 25/0724* (2013.01); *F02D 41/0077* (2013.01); *F02M 25/0773* (2013.01)

USPC . 123/568.16; 123/337; 123/563; 123/568.12; 123/568.15; 123/568.2

(58) Field of Classification Search
CPC ............ Y02T 10/121; F02M 25/0793; F02M 25/0707; F02M 25/0786; F02D 2009/0276
USPC ............. 123/568.16, 568.17, 568.18, 568.19, 123/559.1, 336, 337, 568.2, 563, 568.12, 123/568.21; 701/103, 107, 108; 251/305; 60/605.1, 605.2
See application file for complete search history.

(56) References Cited

U.S. PATENT DOCUMENTS 4,224,912 A * 9/1980 Tanaka ...................... 123/568.19
4,385,496 A * 5/1983 Yamane .......................... 60/599

(Continued)

FOREIGN PATENT DOCUMENTS

| EP | 1 193 388 | 4/2002 |
|---|---|---|
| JP | 2002-106398 | 4/2002 |

(Continued)

*Primary Examiner* — Stephen K Cronin
*Assistant Examiner* — Gonzalo Laguarda
(74) *Attorney, Agent, or Firm* — Nixon & Vanderhye, P.C.

(57) ABSTRACT

When a failure occurs in synchronizing mechanism, an intake air throttle valve is rotated in a direction that is opposite from a normal operational time valve closing direction, so that an arm of a driven plate contacts a throttle valve side stopper to stop rotation of the intake air throttle valve. Thereafter, when a low pressure EGR valve is rotated from a full close position to a full open position, an EGR valve side stopper contacts the arm of the driven plate to stop the low pressure EGR valve. A rotational angle of the EGR valve is sensed with a sensor and is outputted to an ECU. The ECU determines that a failure mode is set when a valve angle sensed with the sensor coincides with a rotation stop position of the EGR valve.

10 Claims, 10 Drawing Sheets

(56) References Cited

U.S. PATENT DOCUMENTS

| | | | |
|---|---|---|---|
| 5,213,087 A * | 5/1993 | Sausner et al. | 123/400 |
| 5,265,578 A * | 11/1993 | Zabeck et al. | 123/568.19 |
| 7,163,005 B2 * | 1/2007 | Tussing et al. | 123/568.12 |
| 7,234,444 B2 * | 6/2007 | Nanba et al. | 123/337 |
| 7,237,531 B2 * | 7/2007 | Atkinson | 123/399 |
| 8,065,992 B2 * | 11/2011 | Tschaler et al. | 123/568.12 |
| 8,261,725 B2 * | 9/2012 | Furukawa et al. | 123/568.19 |
| 2010/0206274 A1 | 8/2010 | Furukawa et al. | |
| 2011/0023846 A1 * | 2/2011 | Miyazaki et al. | 123/568.16 |
| 2011/0088674 A1 * | 4/2011 | Shutty et al. | 123/568.21 |
| 2012/0145134 A1 * | 6/2012 | Miyazaki et al. | 123/568.2 |
| 2012/0297766 A1 * | 11/2012 | Inagaki et al. | 60/605.2 |
| 2014/0007835 A1 * | 1/2014 | Bykans et al. | 123/190.1 |

FOREIGN PATENT DOCUMENTS

| | | |
|---|---|---|
| JP | 2010-190116 | 9/2010 |
| JP | 2010-265923 | 11/2010 |
| JP | 2011-32929 | 2/2011 |

* cited by examiner

LOW PRESSURE EXHAUST GAS RECIRCULATION APPARATUS

CROSS REFERENCE TO RELATED APPLICATION

This application is based on and incorporates herein by reference Japanese Patent Application No. 2011-98847 filed on Apr. 27, 2011 and Japanese Patent Application No. 2011-186262 filed on Aug. 29, 2011.

TECHNICAL FIELD

The present disclosure relates to a low pressure exhaust gas recirculation (EGR) apparatus for an internal combustion engine.

BACKGROUND

An exhaust gas recirculation (EGR) technique, which recirculates a portion of exhaust gas of an internal combustion engine to an air intake side as EGR gas, is known as a technique that limits generation of nitrogen oxide (NOx) contained in the exhaust gas of the engine.

This EGR technique can reduce the quantity of NOx by increasing the quantity of the EGR gas. However, when the EGR gas is excessively recirculated, the particulate matter (PM) is likely generated. With respect to this point, a technique of reducing NOx has been proposed. According to this technique, a combination of an EGR apparatus in a high pressure system and an EGR apparatus in a low pressure system is used to limit the generation of the particulate matter (PM) and to reduce NOx.

However, the EGR apparatus of the low pressure system recirculates the EGR gas from a region, in which the exhaust gas pressure is relatively low, to a region, in which generation of the intake air negative pressure is relatively low. Therefore, although it is possible to return the small quantity of the EGR gas to the engine, it is difficult to recirculate the large quantity of the EGR gas to the engine.

Figure 10:
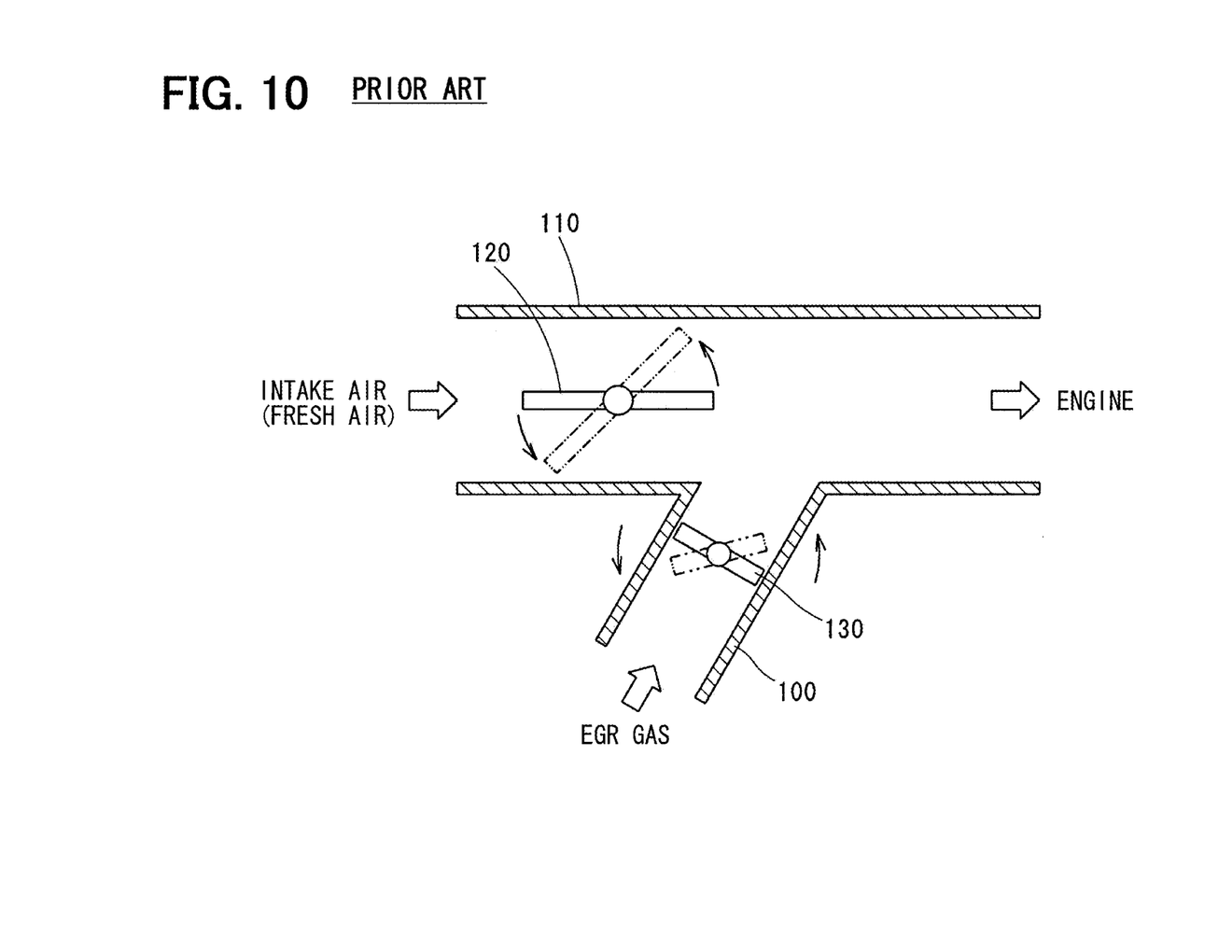
FIG. 10 is a schematic diagram showing a low pressure EGR valve and an intake air throttle valve in a prior art.

In order to address such a disadvantage, JP2011-32929A (corresponding to US 2011/0023846A1) proposes a low pressure EGR apparatus, in which an intake air throttle valve 120 is placed in a portion of an intake passage 110, which is located on an upstream side of a merging portion, at which a low pressure EGR passage 100 is merged with the intake passage 110, as shown in FIG. 10. In an operational range of the engine, in which a large quantity of the EGR gas needs to be recirculated into the engine, the opening degree of the intake air throttle valve 120 is controlled such that the intake air throttle valve 120 is driven in a valve closing direction thereof for closing the intake air throttle valve 120, i.e., in a direction for increasing the negative intake air pressure.

Furthermore, in the low pressure EGR apparatus of JP2011-32929A (corresponding to US 2011/0023846A1), an output (output characteristics) of an actuator, which drives a low pressure EGR valve 130, is converted through a link device and is then transmitted to the intake air throttle valve 120. Thereby, a dedicated actuator, which is dedicated to drive the intake air throttle valve 120, is eliminated. Furthermore, JP2011-32929A (corresponding to US 2011/0023846A1) teaches a technique of determining a failure of the intake air throttle valve 120 with use of a rotational angle sensor, which senses a rotational angle of the low pressure EGR valve 130, in order to counteract a case where the intake air throttle valve 120 cannot be controlled due to a malfunction of the link device.

According to the technique of determining the failure of the intake air throttle valve, the rotational angle of the low pressure EGR valve 130 is sensed to determine that the intake air throttle valve 120 is failed in a case where the opening degree of the intake air throttle valve 120 is different from an opening degree, which corresponds to a maximum opening degree that is limited by a mechanical stopper, i.e., a case where a cam place, which is rotated integrally with the low pressure EGR valve 130, is placed outside of a normal operational angular range. However, in the case of the above failure determining technique, the operational angular range of the cam plate is increased. That is, when the link device is failed, the low pressure EGR valve 130, which is urged in a valve closing direction thereof by a spring, is rotated beyond a full close position, at which the opening degree of the low pressure EGR passage 100 is minimum, in a direction opposite from a normal opening direction (an opening direction in a normal operational state where the link device is not failed). Therefore, the cam plate, which is rotated integrally with the low pressure EGR valve 130, is placed outside of the normal operational angular range of the cam plate.

As a result, since the operational angular range of the cam plate is increased, it is necessary to provide an additional operational space to allow the increase in the operational angular range of the cam plate. Thereby, a size of the low pressure EGR apparatus, which includes the link device, is disadvantageously increased.

SUMMARY

The present disclosure is made in view of the above disadvantages.

According to the present disclosure, there is provided a low pressure exhaust gas recirculation apparatus for an internal combustion engine provided with a supercharger installed in an intake and exhaust system that includes an intake passage, which conducts intake air to be supplied to the internal combustion engine and has a compressor of the supercharger, and an exhaust passage, which conducts exhaust gas outputted from the internal combustion engine and has an exhaust gas purifying device. The low pressure exhaust gas recirculation apparatus includes a low pressure exhaust gas recirculation (EGR) passage, a low pressure EGR valve, a valve drive device, a throttle valve, a synchronizing mechanism, a failure mode setting mechanism and a failure mode determining device. The low pressure EGR passage connects between a portion of the exhaust passage, which is located on a downstream side of the exhaust gas purifying device, and a portion of the intake passage, which is located on an upstream side of the compressor. The low pressure EGR valve is adapted to adjust a flow quantity of low pressure EGR gas to be recirculated from the exhaust passage into the intake passage through the low pressure EGR passage. The valve drive device is adapted to drive the low pressure EGR valve. The throttle valve is installed in one of the exhaust passage and the intake passage and is adapted to reduce an opening degree of the one of the exhaust passage and the intake passage and thereby to increase the flow quantity of the low pressure EGR gas to be recirculated into the intake passage. The synchronizing mechanism is adapted to drive the throttle valve in a closing direction for closing the one of the exhaust passage and the intake passage synchronously with a valve opening movement of the low pressure EGR valve, which is a rotational movement of the low pressure EGR valve in an opening direction for opening the low pressure EGR passage. The synchronizing mechanism is also adapted to drive the throttle valve in an opening direction for opening the one of the exhaust passage and the intake passage synchronously with a valve closing movement of the low pressure EGR valve, which is a rotational movement of the low pressure EGR valve in a closing direction for closing the low pressure EGR passage. The failure mode setting mechanism sets a failure mode by limiting rotation of the throttle valve and rotation of the low pressure EGR valve. The failure mode determining device determines whether the failure mode is set based on a rotational position of the low pressure EGR valve. The failure mode setting mechanism includes a spring, a throttle valve side stopper and an EGR valve side stopper. The spring urges the throttle valve in an urging direction, which is opposite from the closing direction of the throttle valve for closing the one of the exhaust passage and the intake passage synchronously with the valve opening movement of the low pressure EGR valve. The throttle valve side stopper mechanically stops the throttle valve at a predetermined rotational position when the throttle valve is urged by the spring in the urging direction and is thereby rotated in the urging direction. The EGR valve side stopper mechanically stops rotation of the low pressure EGR valve at a corresponding position, which corresponds to the predetermined rotational position of the throttle valve. The failure mode determining device includes a valve angle sensor that senses a rotational position of the low pressure EGR valve as a valve angle. The failure mode determining device determines that the failure mode is set in a case where the valve angle, which is sensed with the valve angle sensor, is the corresponding rotational position of the low pressure EGR valve, which is stopped by the EGR valve side stopper, at time of rotating the low pressure EGR valve from a full close position of the low pressure EGR valve, at which an opening degree of the low pressure EGR passage is minimum, to a full open position of the low pressure EGR valve, at which the opening degree of the low pressure EGR passage is maximum.

BRIEF DESCRIPTION OF THE DRAWINGS

The drawings described herein are for illustration purposes only and are not intended to limit the scope of the present disclosure in any way.

DETAILED DESCRIPTION

First Embodiment

Now, there will be described a first embodiment of the present disclosure, in which EGR apparatuses of the first embodiment are applied to an internal combustion engine that is provided with a supercharger in an intake and exhaust system.

Figure 5:
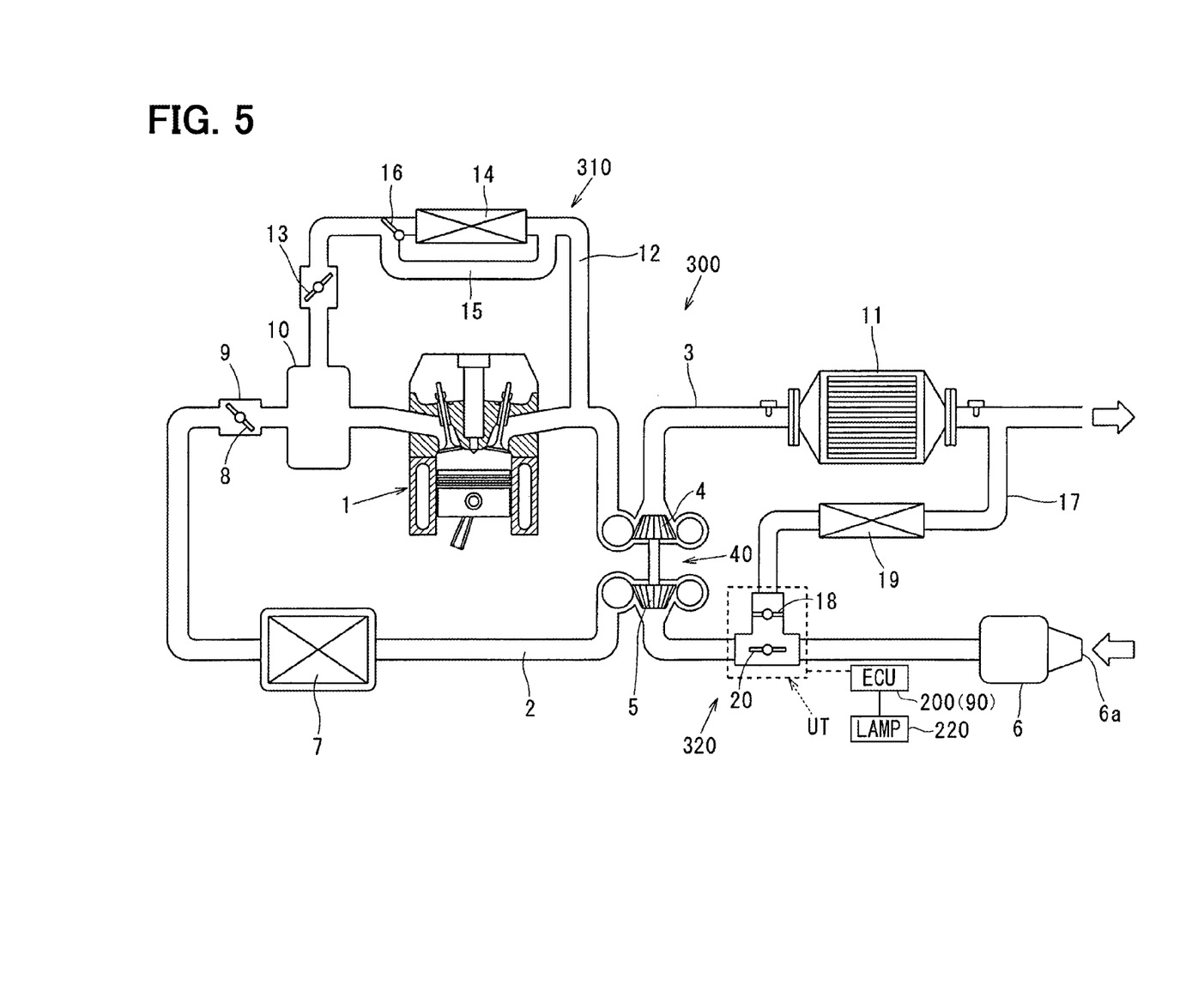
FIG. 5 is a schematic diagram schematically showing an intake and exhaust system of an internal combustion engine according to the first embodiment.

The internal combustion engine (hereinafter referred to as an engine 1) may be, for example, a diesel engine using light oil as its fuel or a gasoline engine using gasoline as its fuel. As shown in FIG. 5, the engine 1 is provided with the intake and exhaust system 300, which includes an intake passage 2 and an exhaust passage 3. The intake passage 2 conducts, i.e., guides intake air to cylinders of the engine 1. The exhaust passage 3 conducts, i.e., guides exhaust gas, which is generated upon combustion of fuel in the cylinders and is outputted from the engine 1, to discharge the exhaust gas to the atmosphere.

In this embodiment, the supercharger is a turbocharger 40 that includes an exhaust turbine 4 and a compressor 5. The exhaust turbine 4 converts the energy of the exhaust gas, which is discharged from the engine 1, into a rotational force. The compressor 5 is coaxially connected to the exhaust turbine 4. When the compressor 5, which is installed in the intake passage 2, is rotated by the rotational force of the exhaust turbine 4, the intake air is compressed and is supplied to the engine 1.

An air cleaner 6, the compressor 5, an intercooler 7, a throttle body 9 and a surge tank 10 are installed in the intake passage 2. The air cleaner 6 removes foreign objects, such as dust, fine sand, debris, which are contained in the external air taken through an intake opening 6a. The intercooler 7 cools the compressed air, which is compressed through the compressor 5. A throttle valve 8, which adjusts a quantity of the intake air to be supplied to the engine 1, is provided in the throttle body 9. The surge tank 10 forms a predetermined volume chamber.

The exhaust turbine 4 and a diesel particulate filter (DPF) 11 are installed in the exhaust passage 3. The DPF 11 collects the particulate matter (PM) contained in the exhaust gas. The DPF 11 is an example of an exhaust gas purifying device of the present disclosure.

Next, the EGR apparatuses will be described.

A high pressure EGR apparatus 310 and a low pressure EGR apparatus 320 are provided in the intake and exhaust system 300 of the engine 1.

The high pressure EGR apparatus 310 is an exhaust gas recirculation apparatus, which recirculates a portion of relatively high temperature and high pressure exhaust gas that has been just discharged from the engine 1, to the air intake side (the intake passage 2) as high pressure EGR gas.

As shown in FIG. 5, the high pressure EGR apparatus 310 includes a high pressure EGR passage 12, a high pressure EGR valve 13, a high pressure EGR cooler 14, a bypass EGR passage 15 and an EGR passage switching valve 16. The high pressure EGR passage 12 connects between a portion of the exhaust passage 3, which is located on the upstream side of the exhaust turbine 4 in the flow direction of the exhaust gas, and a portion of the intake passage 2 (the surge tank 10 in the present embodiment), which is located on the downstream side of the throttle valve 8 in the flow direction of the intake air. The high pressure EGR valve 13 adjusts the flow quantity of the high pressure EGR gas, which is recirculated into the air intake side through the high pressure EGR passage 12. The high pressure EGR cooler 14 cools the high pressure EGR gas, which is recirculated into the air intake side. The bypass EGR passage 15 bypasses the high pressure EGR cooler 14. The EGR passage switching valve 16 switches between an EGR path, which recirculates the high pressure EGR gas to the air intake side through the high pressure EGR cooler 14, and an EGR path, which recirculates the high pressure EGR gas to the air intake side through the bypass EGR passage 15.

The low pressure EGR apparatus 320 is an exhaust gas recirculation apparatus of a low pressure system, which recirculates a portion of relatively low temperature and low pressure exhaust gas to the air intake side as low pressure EGR gas.

As shown in FIG. 5, the low pressure EGR apparatus 320 includes a low pressure EGR passage 17, a low pressure EGR valve 18, a low pressure EGR cooler 19 and an intake air throttle valve 20. The low pressure EGR passage 17 connects between a portion of the exhaust passage 3, which is located on the downstream side of the exhaust turbine 4 (on the downstream side of the DPF 11 in the present embodiment) in the flow direction of the exhaust gas, and a portion of the intake passage 2, which is located on the upstream side of the compressor 5 in the flow direction of the intake air. The low pressure EGR valve 18 adjusts the flow quantity of the low pressure EGR gas, which is recirculated into the air intake side through the low pressure EGR passage 17. The low pressure EGR cooler 19 cools the low pressure EGR gas, which is recirculated into the air intake side. The intake air throttle valve 20 adjusts an opening degree of the intake passage 2 synchronously with the opening/closing movement of the low pressure EGR valve 18, which opens or closes the low pressure EGR passage 17.

Next, the low pressure EGR valve 18 and the intake air throttle valve 20 will be described.

The low pressure EGR valve 18 and the intake air throttle valve 20 are integrated into a low pressure EGR unit UT along with a synchronizing mechanism 210, which will be described in detail below. The low pressure EGR unit UT may include a portion of the intake passage 2 and a portion of the low pressure EGR passage 17 shown in FIG. 1.

Figure 1:
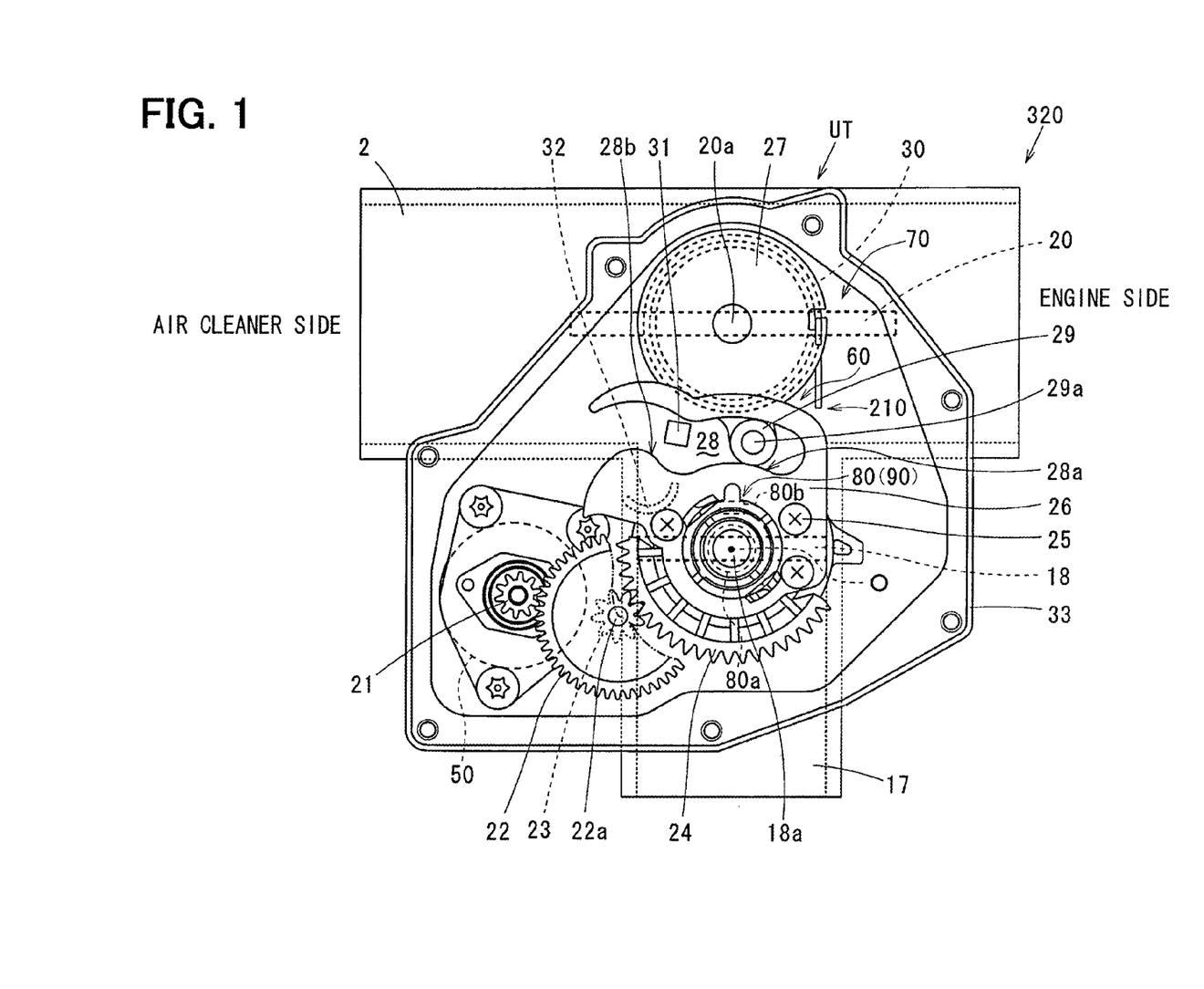
FIG. 1 is a cross-sectional view of a low pressure EGR unit of a low pressure EGR apparatus according to a first embodiment of the present disclosure, showing a full close position of a low pressure EGR valve and a full open position of an intake air throttle valve.

As shown in FIG. 1, the low pressure EGR valve 18 is a butterfly valve, which is rotated integrally with a shaft 18a. The low pressure EGR valve 18 is placed at a location, which is adjacent to an outlet of the low pressure EGR passage 17, which is connected to the intake passage 2. In FIGS. 1 to 4, the left side of the intake passage 2 is the air cleaner 6 side, and the right side of the intake passage 2 is the engine 1 side.

The low pressure EGR valve 18 is rotatable about the shaft 18a between a full close position (a position shown in FIG. 1), at which the valve opening degree of the low pressure EGR valve 18 is minimum, and a full open position (a position shown in FIG. 2), at which the valve opening degree of the low pressure EGR valve 18 is maximum. The low pressure EGR valve 18 is rotated by a rotational force, which is generated by an electric actuator 50 and is transmitted to the shaft 18a through a drive force transmission apparatus described below in detail.

The electric actuator 50 is a valve drive device (valve drive means) and includes, for example, a direct current (DC) electric motor. The amount of electric power, which is supplied to the DC motor, is feedback controlled by an electronic control unit (ECU) 200, which serves as an electronic control device, such that a sensed angle of a valve angle sensor 80, which senses a rotational position of the low pressure EGR valve 18 as a valve angle, coincides with a control target value that is set according to an operational state of the engine 1.

The drive force transmission apparatus includes a gear train, which reduces a rotational speed of the DC motor and thereby to increase a drive torque. The gear train includes a pinion 21, a speed reducing gear 22, a small diameter gear 23 and a valve gear 24. The pinion 21 is installed to an output shaft of the DC motor. The speed reducing gear 22 is meshed with the pinion 21. The small diameter gear 23 is supported by a center shaft 22a, which is a common shaft that supports both of the speed reducing gear 22 and the small diameter gear 23, and the small diameter gear 23 is rotated integrally with the speed reducing gear 22. The valve gear 24 is meshed with the small diameter gear 23. The valve gear 24 is fixed to the shaft 18a of the low pressure EGR valve 18 and is thereby rotated integrally with the shaft 18a.

Similar to the low pressure EGR valve 18, the intake air throttle valve 20 is a butterfly valve that is rotated integrally with a shaft 20a. As shown in FIG. 1, the intake air throttle valve 20 is placed in an EGR gas flow inlet (a connection to the low pressure EGR passage 17) of the intake passage 2, into which the low pressure EGR gas is supplied from the low pressure EGR passage 17.

The intake air throttle valve 20 is connected to the low pressure EGR valve 18 through the synchronizing mechanism 210 described below. When the intake air throttle valve 20 reduces the opening degree of the intake passage 2 synchronously with the valve opening movement of the low pressure EGR valve 18, which opens the low pressure EGR passage 17, the intake air throttle valve 20 increases the flow quantity of the low pressure EGR gas, which is recirculated into the intake passage 2.

As shown in FIG. 1, the synchronizing mechanism 210 includes a drive plate 26, a driven plate 27 and a cam mechanism 60 (cam means) described below. The drive plate 26 is fixed to the valve gear 24 with screws 25 and is rotated integrally with the low pressure EGR valve 18. The driven plate 27 is fixed to the shaft 20a of the intake air throttle valve 20 and is thereby rotated integrally with the intake air throttle valve 20. The cam mechanism 60 transmits rotation of the drive plate 26 to the driven plate 27.

The cam mechanism 60 (cam means) includes a cam groove 28 and a roller 29. The cam groove 28 is formed in the drive plate 26. The roller 29 is installed to the driven plate 27 and is received in the cam groove 28.

The cam groove 28 includes a first cam surface 28a and a second cam surface 28b, which have different cam profiles, respectively. The cam profile of the first cam surface 28a is formed by an arc that is spaced from a rotational center O of the drive plate 26 by a constant distance (length) along the entire circumferential extent of the arc, so that the cam profile of the first cam surface 28a can hold the intake air throttle valve 20 in the full open position (the position shown in FIG. 1) throughout a predetermined rotational angle (a predetermined rotational period), which is from the full close position of the low pressure EGR valve 18 shown in FIG. 1 to an intermediate opening degree (e.g., generally a middle position between the full close position and the full open position) of the low pressure EGR valve 18. The second cam surface 28b is continuous from the first cam surface 28a. The cam profile of the second cam surface 28b is set to drive the intake air throttle valve 20 to the full close position at the time of rotating the low pressure EGR valve 18 from the middle opening degree to the full open position shown in FIG. 2.

A roller shaft 29a is fixed to an arm 27a (see FIG. 3), which is formed in the driven plate 27. The roller 29 is rotatably fitted to an outer peripheral surface of the roller shaft 29a.

An outer peripheral portion of the driven plate 27 is configured into a generally circular shape, and the driven plate 27 is fixed to the shaft 20a, which extends through a radial center portion of the driven plate 27. The arm 27a, to which the roller shaft 29a is fixed, is formed in a circumferential portion of the driven plate 27, and the arm 27a outwardly projects in the radial direction of the driven plate 27. A distal end of the arm 27a is configured into an arcuate shape having a predetermined curvature.

When the drive plate 26 is rotated integrally with the low pressure EGR valve 18, the roller 29 of the cam mechanism 60 (cam means) is moved along the cam groove 28 formed in the drive plate 26 to follow the cam profile of the cam groove 28. Thereby, the rotation of the drive plate 26 is transmitted to the driven plate 27, so that the intake air throttle valve 20 is rotated integrally with the driven plate 27.

The low pressure EGR unit UT of the present embodiment includes a failure mode setting mechanism 70 (failure mode setting means) and a failure mode determining device 90 (failure mode determining means). The failure mode setting mechanism 70 sets a failure mode when the synchronizing mechanism 210 fails. The failure mode determining device 90 determines whether the failure mode is set. The failure mode is set at the time of occurrence of the failure of the synchronizing mechanism 210. Specifically, the failure mode is set when the roller shaft 29a and the roller 29 are dismounted from the driven plate 27, so that the rotation of the drive plate 26 cannot be transmitted to the driven plate 27. In other words, the failure mode is set when coupling between the drive plate 26 and the driven plate 27 is released due to occurrence of the malfunction in the cam mechanism 60, which will be discussed later in detain, to free the drive plate 26 and the driven plate 27 from each other.

The failure mode setting mechanism 70 (failure mode setting means) includes a spring 30, a throttle valve side stopper 31 and an EGR valve side stopper 32. The spring 30 urges the intake air throttle valve 20 in an urging direction thereof (the clockwise direction in FIGS. 1 and 2). The throttle valve side stopper 31 mechanically stops the intake air throttle valve 20 at a predetermined rotational position upon rotation of the intake air throttle valve 20 in the urging direction (the clockwise direction in FIGS. 1 and 2) by the urging force of the spring 30 at the time of occurrence of the failure discussed above. The EGR valve side stopper 32 is formed in the drive plate 26 and mechanically stops the rotation of the low pressure EGR valve 18 at a position, which corresponds to the stop position (the predetermined rotational position shown in FIG. 4) of the intake air throttle valve 20.

The spring 30 urges the intake air throttle valve 20 in the direction (the clockwise direction in FIGS. 1 and 2) that is opposite from a valve closing direction of the intake air throttle valve 20, which is a rotational direction for closing the intake passage 2 with the intake air throttle valve 20 synchronously with the valve opening movement of the low pressure EGR valve 18. Specifically, the spring 30 urges the intake air throttle valve 20 in the urging direction, i.e., the opposite direction (the clockwise direction in FIGS. 1 and 2), which is opposite from the normal operation time valve closing direction (the counterclockwise direction in FIGS. 1 and 2) of the intake air throttle valve 20, which is a direction of rotating the intake air throttle valve 20 from the position of FIG. 1 to the position of FIG. 2.

The throttle valve side stopper 31 may be provided in, for instance, a case 33 (see FIG. 1) of the low pressure EGR unit UT. The throttle valve side stopper 31 is placed to oppose the driven plate 27 (more specifically the arm 27a of the driven plate 27) in the rotational direction (the clockwise direction in FIGS. 1 and 2) of the driven plate 27, which is urged by the spring 30 and is rotated integrally with the intake air throttle valve 20 at the time of occurrence of the failure discussed above. As shown in FIG. 3, when a lateral surface of the arm 27a of the driven plate 27 contacts the throttle valve side stopper 31, the rotation of the intake air throttle valve 20 is mechanically limited, i.e., stopped.

The throttle valve side stopper 31 is placed at a location, at which the intake air throttle valve 20 is stopped while opening the intake passage 2 by a predetermined opening degree without fully closing the intake passage 2 at the time when the rotation of the driven plate 27 is limited by the contacting of the arm 27a of the driven plate 27 to the throttle valve side stopper 31. That is, the throttle valve side stopper 31 is placed at the location, at which the rotation of the intake air throttle valve 20 is stopped between the full close position of the intake air throttle valve 20 (this full close position of the intake air throttle valve 20 being opposite from the normal operation time full close position of the intake air throttle valve 20 shown in FIG. 2 and being achieved by rotating the intake air throttle vale 20 of FIG. 2 by 90 degrees in the clockwise direction in FIG. 2) and the full open position (the position of FIG. 1) of the intake air throttle valve 20. Specifically, for the descriptive purpose, it is assumed that the valve opening degree of the intake air throttle valve 20 is 0% in the full close position of the intake air throttle valve 20, in which the opening degree of the intake air throttle valve 20 is minimum, and the valve opening degree of the intake air throttle valve 20 is 100% in the full open position of the intake air throttle valve 20, in which the opening degree of the intake air throttle valve 20 is maximum. In such a case, the throttle valve side stopper 31 is placed in the position, at which the rotation of the intake air throttle valve 20 can be stopped in a range of 50% to 100% of the valve opening degree of the intake air throttle valve 20.

Figure 4:
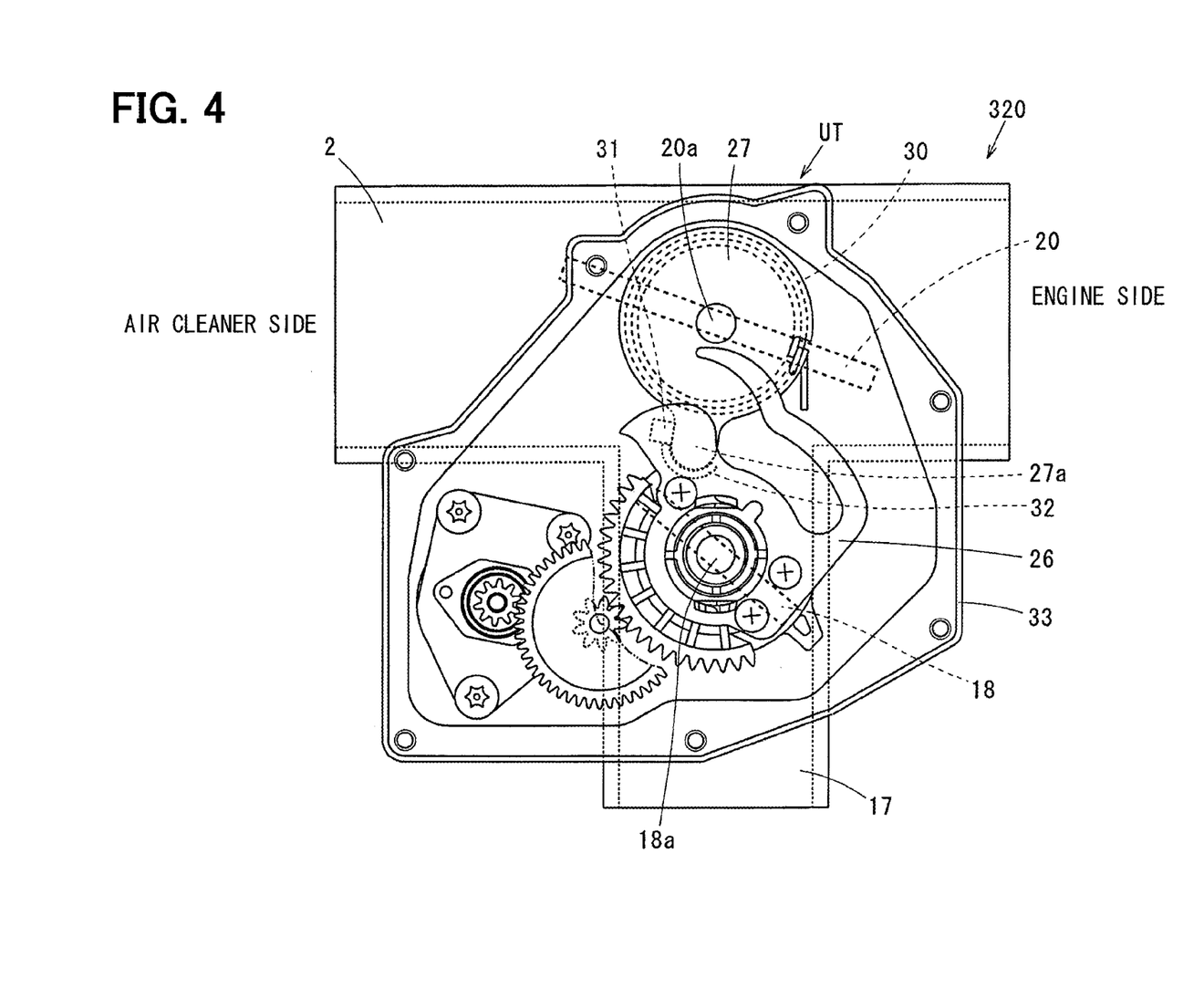
FIG. 4 is a cross-sectional view of the low pressure EGR unit according to the first embodiment, showing a state where rotation of the low pressure EGR valve is mechanically stopped by an EGR valve side stopper.

As shown in FIG. 4, the EGR valve side stopper 32 mechanically stops the rotation of the low pressure EGR valve 18 when the EGR valve side stopper 32 contacts the distal end portion of the arm 27a of the driven plate 27 upon driving the low pressure EGR valve 18 in the valve opening direction of the low pressure EGR valve 18 for opening the low pressure EGR passage 17 from the full close position of the low pressure EGR valve 18 (position of FIG. 1) at the time of occurrence of the failure discussed above. The EGR valve side stopper 32 is placed in the location, at which the rotation of the low pressure EGR valve 18 stops at an intermediate location (generally a middle position in the first embodiment) between the full close position of the low pressure EGR valve 18 and the full open position of the low pressure EGR valve 18. That is, when the low pressure EGR valve 18 is rotated from the full close position to the middle position, the EGR valve side stopper 32 contacts the arm 27a to stop the rotation of the low pressure EGR valve 18. The EGR valve side stopper 32 is configured into an arcuate shape, which corresponds to the shape of the distal end portion of the arm 27a.

The failure mode determining device 90 (failure mode determining means) includes the ECU 200 and the valve angle sensor 80 and determines whether the failure mode is set based on the sensed angle of the valve angle sensor 80, which senses the rotational position (valve angle) of the low pressure EGR valve 18.

The valve angle sensor 80 is, for example, a noncontact rotational angle sensor, which includes a permanent magnet 80a and a Hall IC 80b. The permanent magnet 80a is installed to the shaft 18a of the low pressure EGR valve 18, and the Hall IC 80b is placed at a location, which is adjacent to the permanent magnet 80a. An electric signal, which is generated at the Hall IC 80b, is outputted to the ECU 200.

The failure mode determining device 90 (failure mode determining means) determines that the failure mode is set in a case where the valve angle, which is sensed with the valve angle sensor 80, is a rotational position of the low pressure EGR valve 18 that is stopped by the EGR valve side stopper 32.

Next, an operation of the low pressure EGR apparatus 320 will be described.

First of all, the normal time operation, in which the synchronizing mechanism 210 is not failed, will be described.

When the low pressure EGR valve 18 is driven from the full close position to the full open position, the intake air throttle valve 20 is drive from the full open position to the full close position through the synchronizing mechanism 210. In this operational time, the roller 29, which is installed to the driven plate 27, is moved along the first cam surface 28a throughout the predetermined rotational angle (predetermined rotational period) from the full close position of the low pressure EGR valve 18 to the middle position of the low pressure EGR valve 18 (e.g., the position, at which the valve opening degree of the low pressure EGR valve 18 is 50%), so that the intake air throttle valve 20 is not rotated and is held in the full open position thereof shown in FIG. 1.

Thereafter, when the low pressure EGR valve 18 is rotated from the middle position to the full open position, the roller 29 is moved in the cam groove 28 along the second cam surface 28b. Thereby, the intake air throttle valve 20 is rotated from the full open position to the full close position shown in FIG. 2. In this way, the negative intake pressure, which is generated in the intake stroke of the engine 1, is increased, so that a large quantity of the EGR gas can be recirculated into the engine 1.

Next, the failure time operation, in which the synchronizing mechanism 210 is failed, will be described.

In the case where the synchronizing mechanism 210 is failed, i.e., the roller 29 and the roller shaft 29a are dismounted from the driven plate 27 to free the drive plate 26 and the driven plate 27 from each other, the intake air throttle valve 20 is rotated by the urging force of the spring 30 in the urging direction, i.e., the opposite direction (the clockwise direction), which is opposite from the normal operation time closing direction of the intake air throttle valve 20. As shown in FIG. 3, when the lateral surface of the arm 27a of the driven plate 27 contacts the throttle valve side stopper 31, the rotation of the intake air throttle valve 20, which is rotated in the clockwise direction, is stopped.

Thereafter, as shown in FIG. 4, when the low pressure EGR valve 18 is driven from the full close position to the full open position, the EGR valve side stopper 32 of the drive plate 26 contacts the distal end portion of the arm 27a of the driven plate 27, and thereby the rotation of the low pressure EGR valve 18 is mechanically stopped. The rotational position of the low pressure EGR valve 18, i.e., the valve angle of the low pressure EGR valve 18, which is stopped by the EGR valve side stopper 32, is sensed with the valve angle sensor 80, and the sensed result of the valve angle sensor 80 is outputted to the ECU 200. When the valve angle of the low pressure EGR valve 18, which is sensed with the valve angle sensor 80, coincides with the rotational position of the low pressure EGR valve 18, which is stopped by the EGR valve side stopper 32, the ECU 200 determines that the failure mode is set. When the ECU 200 determines that the failure mode is set, the ECU 200 executes a warning operation to notify the setting of the failure mode through a warning device (e.g., a visual warning device or a sound warning device). For instance, the warning operation may be a display operation, such as turning on of a warning lamp 220, to notify the setting of the failure mode to an occupant of the vehicle.

Now, advantages of the first embodiment will be described.

The low pressure EGR apparatus 320 of the first embodiment can execute the failure determination within the normal operation range of driving the low pressure EGR valve 18 from the full close position to the full open position at the time of occurrence of the failure of the synchronizing mechanism 210, i.e., at the time of dismounting of the roller 29 and the roller shaft 29a from the driven plate 27 to free the drive plate 26 and the driven plate 27 from each other. That is, when the failure mode is set, the rotation of the low pressure EGR valve 18 from the full close position in the valve opening direction, which is opposite from the normal operational time valve opening direction, cannot be made. In this way, the operational angular range of the drive plate 26, which is rotated integrally with the low pressure EGR valve 18, is not increased. Therefore, it is not required to provide an excess amount of space, which extends beyond the normal operational angular range. Therefore, in comparison to the prior art technique disclosed in JP2011-32929A (corresponding to US 2011/0023846A1), the size of the low pressure EGR unit UT can be reduced.

Furthermore, when the failure mode is set, the throttle valve side stopper 31, which mechanically stops the rotation of the intake air throttle valve 20, can stop the rotation of the intake air throttle valve 20 in the valve opening degree range of 50% to 100%. In this way, the intake air throttle valve 20 is not stopped at the full close position thereof, at which the opening degree of the intake air throttle valve 20 is minimum. Thereby, the opening degree of the intake passage 2 can be maintained at 50% or higher. In such a case, the intake air (fresh air) to be drawn into the engine 1 is not substantially reduced, so that the operational state of the engine 1 is not significantly influenced.

Second Embodiment

Figure 6:
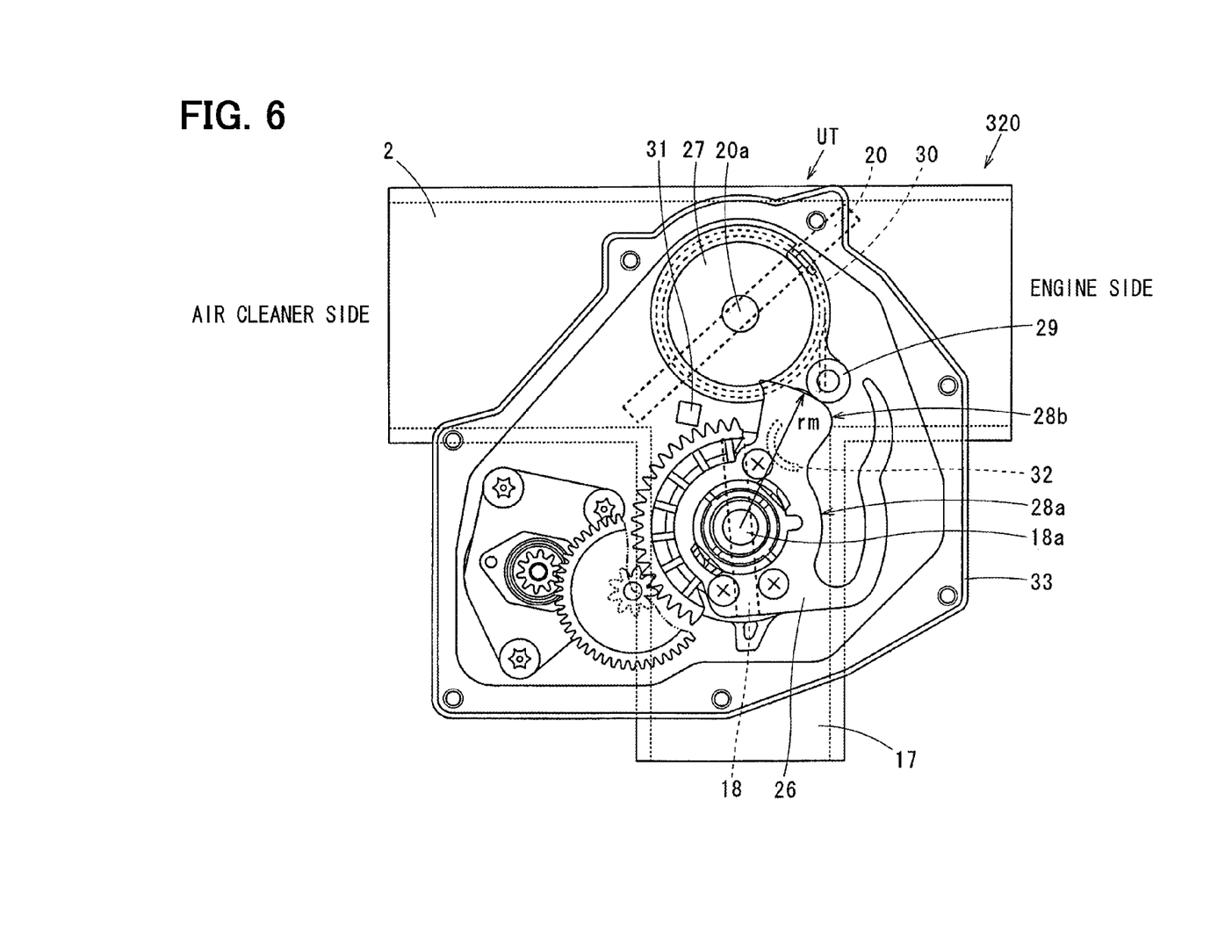
FIG. 6 is a cross-sectional view of a low pressure EGR unit according to a second embodiment, showing a full open position of the low pressure EGR valve and a full close position of the intake air throttle valve.

FIG. 6 shows a cross-sectional view of a low pressure EGR unit UT according to a second embodiment of the present disclosure.

Figure 2:
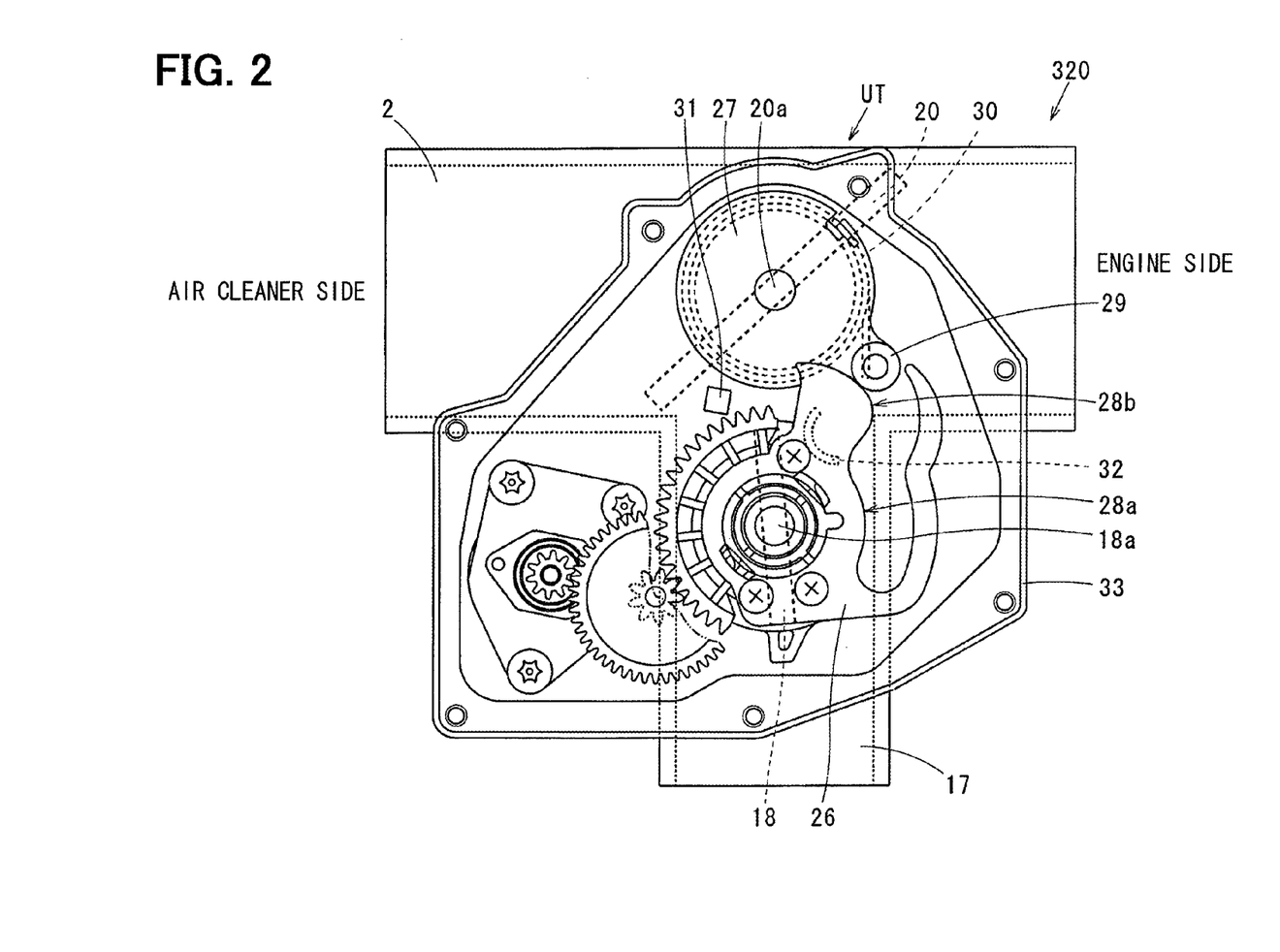
FIG. 2 is a cross-sectional view of the low pressure EGR unit according to the first embodiment, showing a full open position of the low pressure EGR valve and a full close position of the intake air throttle valve.
Figure 3:
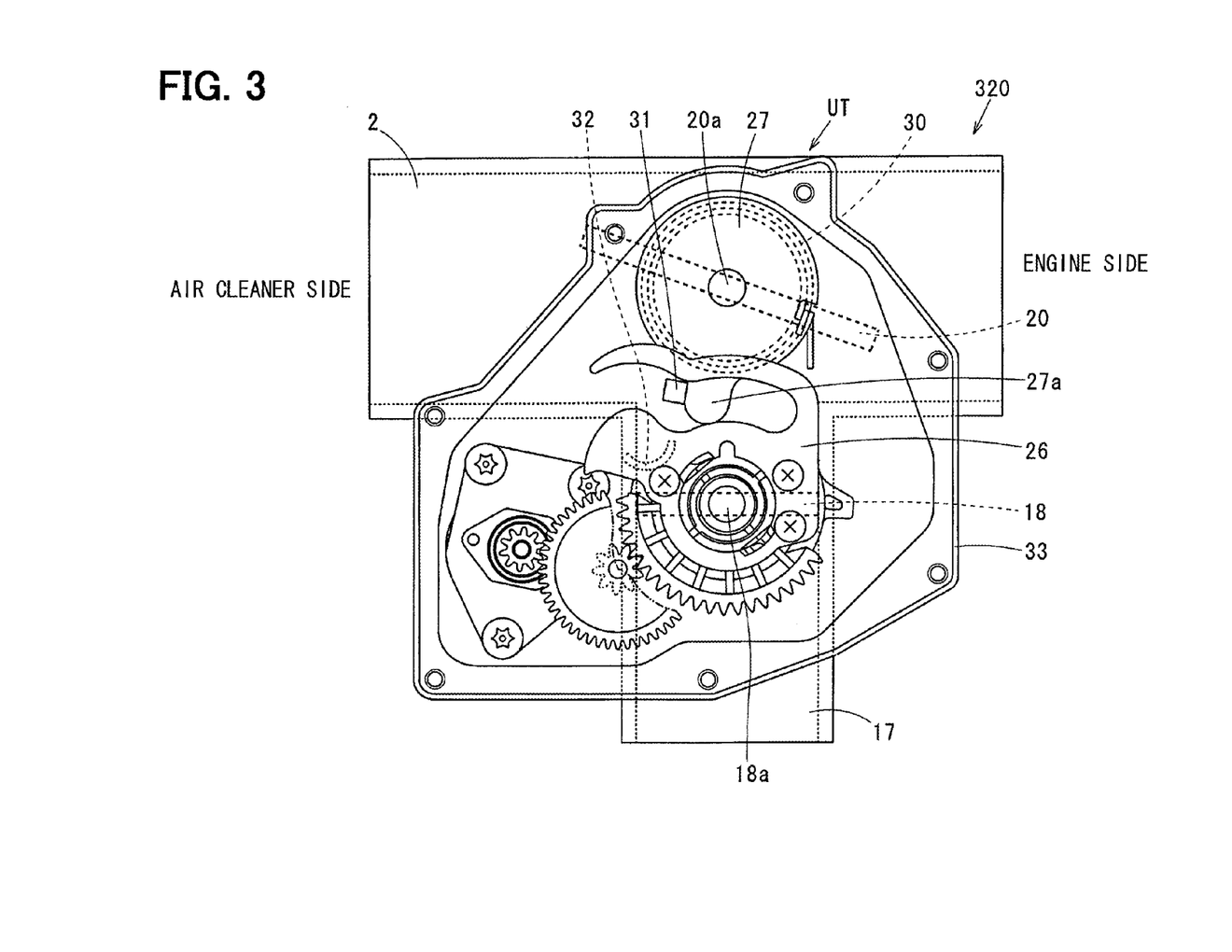
FIG. 3 is a cross-sectional view of the low pressure EGR unit according to the first embodiment, showing a state where rotation of the intake air throttle valve is mechanically stopped by a throttle valve side stopper.

The second cam surface 28b discussed in the first embodiment has the cam profile, which drives the intake air throttle valve 20 to the full close position at the time of rotating the low pressure EGR valve 18 from the middle opening degree to the full open position shown in FIG. 2. In the second embodiment, the cam profile of the second cam surface 28b has an insensitive zone, which limits a variation (also referred to as a valve opening degree variation) in the opening degree of the intake air throttle valve 20 in the full close position thereof in response to a variation (also referred to as a valve opening degree variation) in the opening degree of the low pressure EGR valve 18 in the full open position.

Figure 7A:
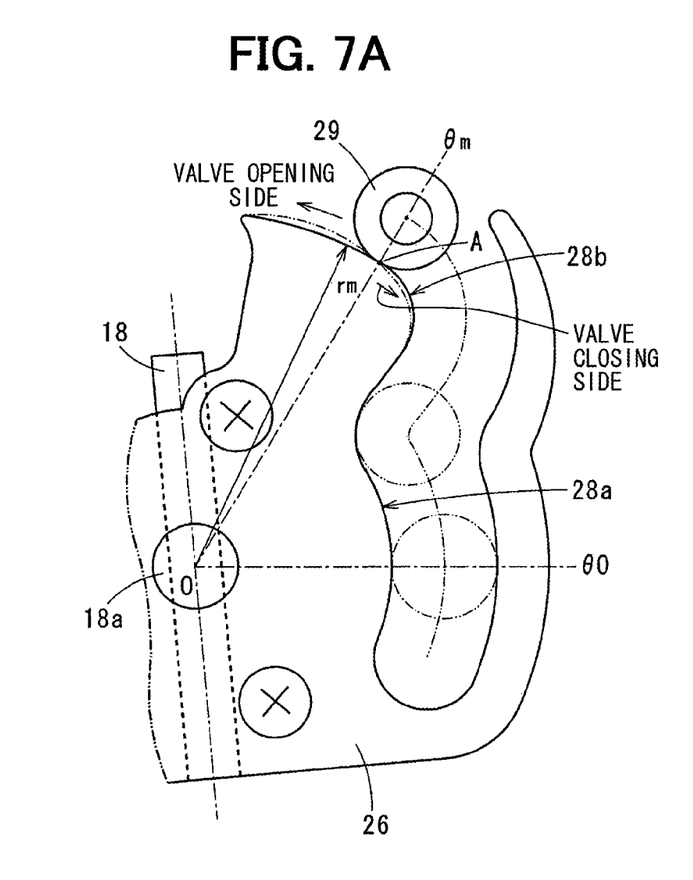
FIG. 7A is a plan view showing a positional relationship between a drive plate and a roller according to the second embodiment.

In the following description, as shown in FIG. 7A, the rotational angle $\theta 0$ of the low pressure EGR valve 18 in the full close position is set as a reference angle, and the rotational angle of the low pressure EGR valve 18 in the full open position is set as θm. Furthermore, a contact point on the second cam surface 28b, to which the roller 29 contacts at the time of driving the low pressure EGR valve 18 to the full open position, is referred to as a contact point A. One side of the contact point A, which is located on the first cam surface 28a side, is defined as a valve closing side. Furthermore, the other side of the contact point A, which is located on the opposite side that is opposite from the valve closing side, is defined as a valve opening side.

Figure 7B:
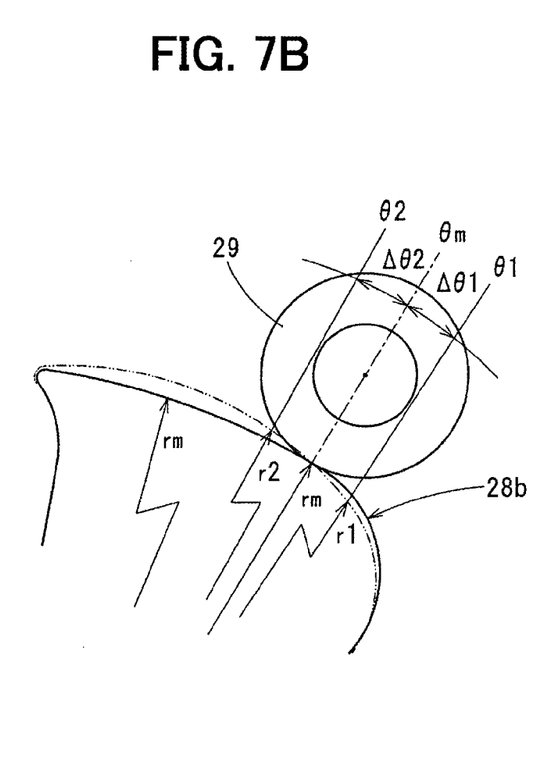
FIG. 7B is a partial enlarged view of FIG. 7A, showing a cam profile, in which an insensitive zone is set.
Figure 8:
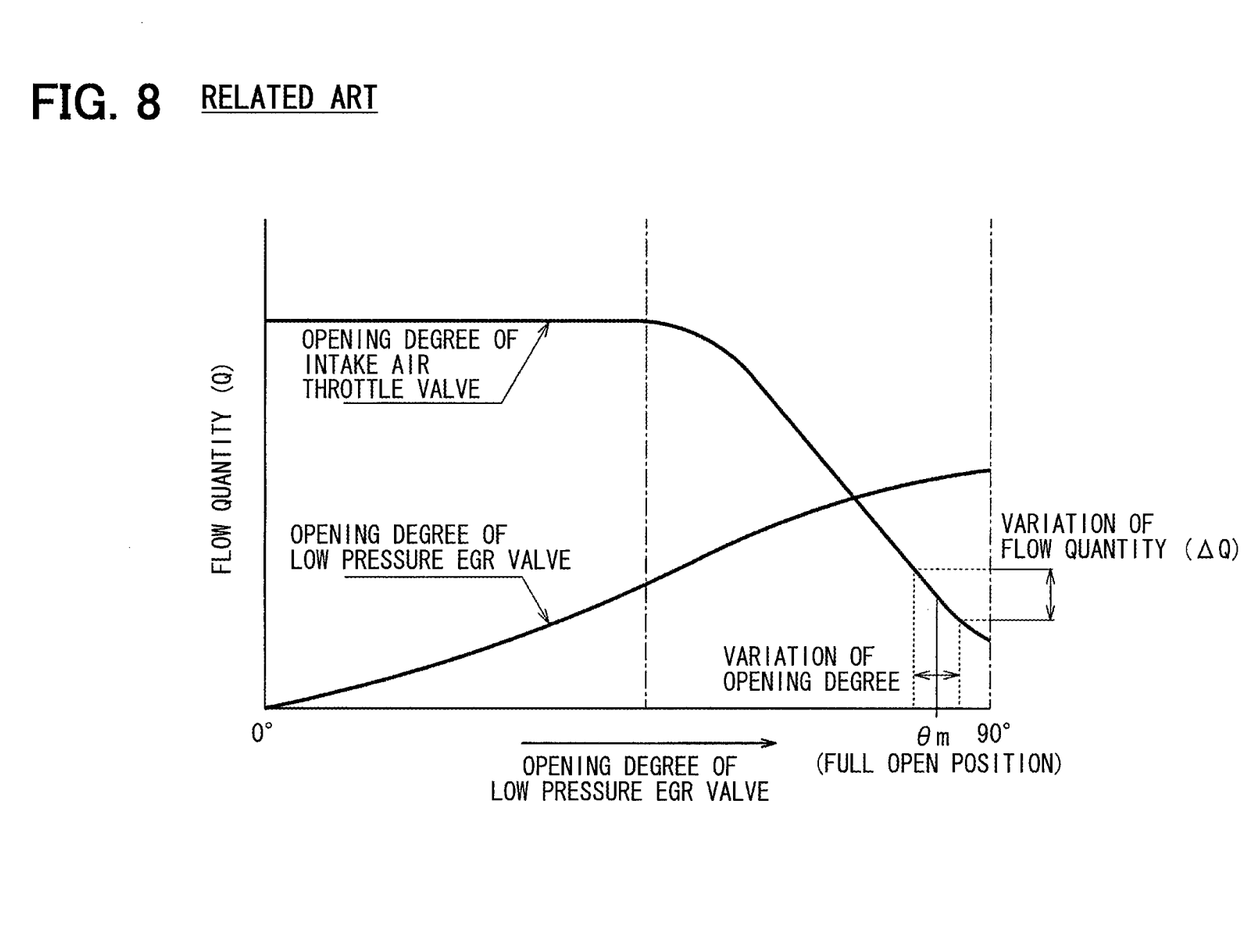
FIG. 8 is a graph showing opening degree characteristics of a low pressure EGR valve and an intake air throttle valve in a comparative example.

Here, for descriptive purpose of illustrating a comparative example, it is assumed that the second cam surface 28b has a cam profile, which is indicated by a dot-dot-dash line shown in FIG. 7B. In such a case, when the low pressure EGR valve 18 has a valve opening degree variation Δθ1 in the valve closing side and a valve opening degree variation Δθ2 in the valve opening side with respect to the rotational angle θm, the variation ΔQ is present in the quantity of the intake air due to the variation in the full close position of the intake air throttle valve 20, as shown in FIG. 8. The cam profile, which is indicated by the dot-dot-dash line in FIG. 7B, is formed by a curved line, which extends through the contact point between the second cam surface 28b and the roller 29 and has a progressively decreasing curvature from the valve closing side toward the valve opening side, i.e., a curved line, which is spaced from the rotational center O of the drive plate 26 (see FIG. 7A) by a distance that is progressively increased from the valve closing side toward the valve opening side (r1<rm<r2).

When the variation exists in the full open position of the low pressure EGR valve 18, the following disadvantages may occur.

(a) The case where the variation exists in the full open position of the low pressure EGR valve 18 on the smaller side, i.e., the case where the rotational angle of the low pressure EGR valve 18 in the full close position is deviated by θ1 shown in FIG. 7B.

The full open position of the intake air throttle valve 20 is deviated from a target value thereof on the larger side of the target value, as shown in FIG. 8, so that the pressure difference between the pressure on the front side of the low pressure EGR valve 18 and the pressure on the rear side of the low pressure EGR valve 18 becomes smaller than a target value thereof. Therefore, the flow quantity of the low pressure EGR gas recirculated into the air intake side is decreased, so that the emission is deteriorated.

(b) The case where the variation exists in the full open position of the low pressure EGR valve 18 on the larger side, i.e., the case where the rotational angle of the low pressure EGR valve 18 in the full close position is deviated by θ2 shown in FIG. 7B.

The full close position of the intake air throttle valve 20 is deviated from the target value thereof on the smaller side, as shown in FIG. 8, so that the quantity of intake air is further throttled, i.e., is reduced. Therefore, the quantity of intake air supplied to the combustion chamber becomes insufficient, and thereby the engine performance is deteriorated.

Figure 9:
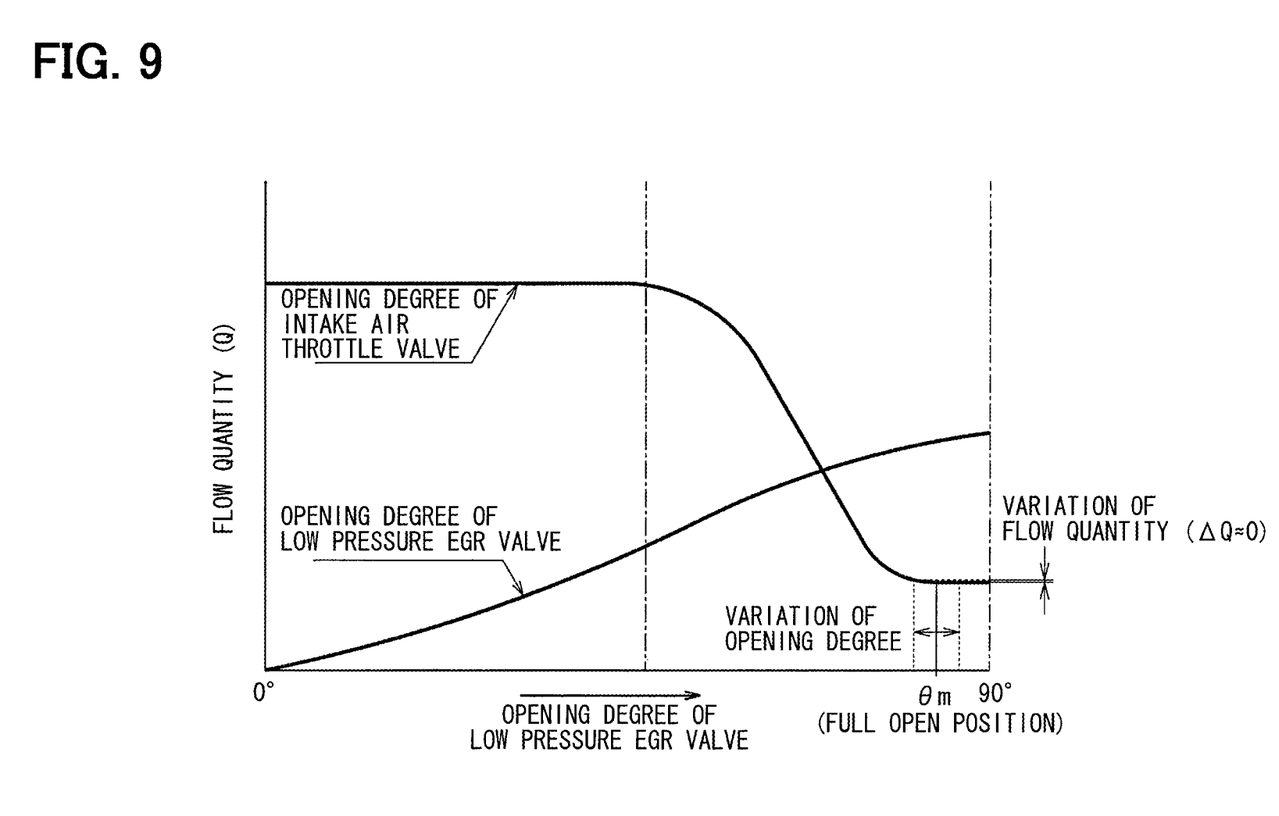
FIG. 9 is a graph showing opening degree characteristics of the low pressure EGR valve and the intake air throttle valve according to the second embodiment.

In contrast to the above described comparative example, as indicated by a solid line in FIG. 7B, the second cam surface 28b of the second embodiment has a cam profile, which is an arc that is spaced from the rotational center O of the drive plate 26 by a constant distance (length) rm along the entire circumferential extent of the arc at least in an angular range from the rotational angle θ1 to the rotational angle θ2. That is, the angular range, which is at least from the rotational angle θ1 to the rotational angle θ2, forms the insensitive zone, in which the opening degree of the intake air throttle valve 20 is insensitive to, i.e., is not influenced by the variation in the opening degree of the low pressure EGR valve 18. Therefore, even in the case where the variation exists in the full open position of the low pressure EGR valve 18, the roller 29 is stopped, i.e., is stationary on the portion of the cam profile, which is located in the angular range from the rotational angle θ1 to the rotational angle θ2. In other words, even when the drive plate 26 is rotated by the amount of the valve opening degree deviation of the low pressure EGR valve 18, the roller 29 does not receive the drive force from the portion of the cam profile, which is located between the rotational angle θ1 to the rotational angle θ2, since the portion of the cam profile, which is located between the rotational angle θ1 to the rotational angle θ2, is formed by the arc, which is spaced from the rotational center O of the drive plate 26 by the constant distance (length) along the entire circumferential extent of the arc. Therefore, the driven plate 27, which has the roller 29, is not rotated. As a result, even when the deviation exists in the full open position of the low pressure EGR valve 18, it is possible to limit the variation in the opening degree of the intake air throttle valve 20 in the full close position thereof (possible to substantially eliminate the deviation in the opening degree of the intake air throttle valve 20). Therefore, as shown in FIG. 9, it is possible to substantially eliminate the variation ΔQ in the flow quantity of the intake air. Therefore, it is possible to limit the deterioration in the engine performance and the deterioration in the emissions.

Now, modifications of the above embodiments will be described.

In the low pressure EGR unit UT of the first and second embodiments, the intake air throttle valve 20 is placed at the EGR gas flow inlet (the connection to the low pressure EGR passage 17) of the intake passage 2, into which the low pressure EGR gas is supplied from the low pressure EGR passage 17. Alternatively, the intake air throttle valve 20 may be placed in another portion of the intake passage 2, which is located on the upstream side of the connection to the low pressure EGR passage 17 in the flow direction of the intake air (on the left side in FIG. 1 or FIG. 6). Furthermore, in the first and second embodiments, the intake air throttle valve 20 is discussed as the throttle valve of the present disclosure. Alternatively, in place of the intake air throttle valve 20, the throttle valve of the present disclosure may be applied as an exhaust gas throttle valve. This exhaust gas throttle valve may be placed in, for example, a connection between the exhaust passage 3 and the low pressure EGR passage 17 or a portion of the exhaust passage 3 located on the downstream side of the connection to the low pressure EGR passage 17. The exhaust gas throttle valve throttles, i.e., reduces the opening of the exhaust passage to increase the flow quantity of the low pressure EGR gas.

In the first embodiment, the low pressure EGR apparatus 320 of the present disclosure is applied to the engine 1 having the turbocharger 40 in the intake and exhaust system 300. However, the present disclosure is not limited to such a turbocharger. For example, the present disclosure may be applied to the engine 1 having a supercharger that includes the compressor 5, which is installed in the intake passage 2 and is driven by the engine 1. In such a case, the upstream end (the inlet of the low pressure EGR gas) of the low pressure EGR passage 17 is connected to a portion of the exhaust passage 3, which is located on the downstream side of the exhaust gas purifying device (the DPF 11 in the first embodiment). That is, a portion of the exhaust gas, which is purified through the exhaust gas purifying device, is recirculated into the intake passage 2 as the low pressure EGR gas.

In the first embodiment, when the failure mode is set, the lateral surface of the arm 27a of the driven plate 27 contacts the throttle valve side stopper 31 to stop the rotation of the intake air throttle valve 20. Alternatively, for example, the throttle valve side stopper 31 may be placed in the intake passage 2, and the end portion of the intake air throttle valve 20 may directly contact the throttle valve side stopper 31 to stop the rotation of the intake air throttle valve 20.

Additional advantages and modifications will readily occur to those skilled in the art. The present disclosure in its broader terms is therefore not limited to the specific details, representative apparatus, and illustrative examples shown and described.

What is claimed is:

1. A low pressure EGR apparatus applied to an internal combustion engine having a supercharger installed in an intake and exhaust system, wherein the low pressure EGR apparatus recirculates a portion of exhaust gas, which has passed through an exhaust gas purifying device provided in an exhaust passage of the internal combustion engine, to an intake passage at a location that is on an upstream side of a compressor of the supercharger, as low pressure EGR gas, the low pressure-EGR apparatus comprising:

a low pressure EGR passage that connects between a portion of the exhaust passage, which is located on a downstream side of the exhaust gas purifying device, and a portion of the intake passage, which is located on an upstream side of the compressor;

a low pressure EGR valve that adjusts a flow quantity of the low pressure EGR gas to be recirculated into the intake passage through the low pressure EGR passage;

a valve drive device that drives the low pressure EGR valve;

a throttle valve that is installed in one of the exhaust passage and the intake passage, wherein the throttle valve reduces an opening degree of the one of the exhaust passage and the intake passage to increase the flow quantity of the low pressure EGR gas to be recirculated into the intake passage;

a synchronizing mechanism that drives the throttle valve in a closing direction for closing the one of the exhaust passage and the intake passage synchronously with a valve opening movement of the low pressure EGR valve, which is a rotational movement of the low pressure EGR valve in an opening direction for opening the low pressure EGR passage, wherein the synchronizing mechanism drives the throttle valve in an opening direction for opening the one of the exhaust passage and the intake passage synchronously with a valve closing movement of the low pressure EGR valve, which is a rotational movement of the low pressure EGR valve in a closing direction for closing the low pressure EGR passage, wherein the synchronizing mechanism includes a drive plate that is rotated integrally with the low pressure EGR valve, a driven plate that is rotated integrally with the throttle valve, and a cam mechanism that transmits rotation of the drive plate to the driven plate;

a failure mode setting mechanism that sets a failure mode by limiting rotation of the throttle valve and rotation of the low pressure EGR valve and sets the failure mode in a state where coupling between the drive plate and the driven plate is released due to malfunction of the cam mechanism; and a failure mode determining device that determines whether the failure mode is set based on a rotational position of the low pressure EGR valve, wherein:

the failure mode setting mechanism includes:

a spring that urges the throttle valve in an opposite direction, which is opposite from the closing direction of the throttle valve for closing the one of the exhaust passage and the intake passage synchronously with the valve opening movement of the low pressure EGR valve;

a throttle valve side stopper that mechanically stops the throttle valve at a predetermined rotational position when the throttle valve is urged by the spring and is thereby rotated; and a valve side stopper that mechanically stops rotation of the low pressure EGR valve in response to a stop position of the throttle valve;

the failure mode determining device includes a valve angle sensor that senses a rotational position of the low pressure EGR valve as a valve angle; and the failure mode determining device determines that the failure mode is set in a case where the valve angle, which is sensed with the valve angle sensor, is the rotational position of the low pressure EGR valve, which is stopped by the valve side stopper, at a time of rotating the low pressure EGR valve from a full close position of the low pressure EGR valve, at which an opening degree of the low pressure EGR valve is minimum, to a full open position of the low pressure EGR valve, at which the opening degree of the low pressure EGR valve is maximum, wherein:

the throttle valve side stopper is placed to oppose the driven plate in a rotational direction of the driven plate for rotating the driven plate integrally with the throttle valve through urging of the throttle valve with the spring; and the throttle valve stops at the predetermined rotational position when the driven plate contacts the throttle valve side stopper.

2. A low pressure EGR apparatus applied to an internal combustion engine having a supercharger installed in an intake and exhaust system, wherein the low pressure EGR apparatus recirculates a portion of exhaust gas, which has passed through an exhaust as purifying device provided in an exhaust passage of the internal combustion engine, to an intake passage at a location that is on an upstream side of a compressor of the supercharger, as low pressure EGR gas, the low pressure-EGR apparatus comprising:

a low pressure EGR passage that connects between a portion of the exhaust passage, which is located on a downstream side of the exhaust gas purifying device, and a portion of the intake passage, which is located on an upstream side of the compressor;

a low pressure EGR valve that adjusts a flow quantity of the low pressure EGR gas to be recirculated into the intake passage through the low pressure EGR passage;

a valve drive device that drives the low pressure EGR valve;

a throttle valve that is installed in one of the exhaust passage and the intake passage, wherein the throttle valve reduces an opening degree of the one of the exhaust passage and the intake passage to increase the flow quantity of the low pressure EGR gas to be recirculated into the intake passage;

a synchronizing mechanism that drives the throttle valve in a closing direction for closing the one of the exhaust passage and the intake passage synchronously with a valve opening movement of the low pressure EGR valve, which is a rotational movement of the low pressure EGR valve in an opening direction for opening the low pressure EGR passage, wherein the synchronizing mechanism drives the throttle valve in an opening direction for opening the one of the exhaust passage and the intake passage synchronously with a valve closing movement of the low pressure EGR valve, which is a rotational movement of the low pressure EGR valve in a closing direction for closing the low pressure EGR passage, wherein the synchronizing mechanism includes a drive plate that is rotated integrally with the low pressure EGR valve, a driven plate that is rotated integrally with the throttle valve, and a cam mechanism that transmits rotation of the drive plate to the driven plate;

a failure mode setting mechanism that sets a failure mode by limiting rotation of the throttle valve and rotation of the low pressure EGR valve and sets the failure mode in a state where coupling between the drive plate and the driven plate is released due to malfunction of the cam mechanism; and a failure mode determining device that determines whether the failure mode is set based on a rotational position of the low pressure EGR valve, wherein:

the failure mode setting mechanism includes:
- a spring that urges the throttle valve in an opposite direction, which is opposite from the closing direction of the throttle valve for closing the one of the exhaust passage and the intake passage synchronously with the valve opening movement of the low pressure EGR valve;
- a throttle valve side stopper that mechanically stops the throttle valve at a predetermined rotational position when the throttle valve is urged by the spring and is thereby rotated; and
- a valve side stopper that mechanically stops rotation o the low pressure EGR valve in response to a stop position of the throttle valve;

the failure mode determining device includes a valve angle sensor that senses a rotational position of the low pressure EGR valve as a valve angle; and the failure mode determining device determines that the failure mode is set in a case where the valve angle, which is sensed with the valve angle sensor, is the rotational position of the low pressure EGR valve, which is stopped by the valve side stopper, at a time of rotating the low pressure EGR valve from a full close position of the low pressure EGR valve, at which an opening degree of the low pressure EGR valve is minimum, to a full open position of the low pressure EGR valve, at which the opening degree of the low pressure EGR valve is maximum, wherein the cam mechanism has an insensitive zone, which limits a variation in an opening degree of the throttle valve in the full close position of the throttle valve with respect to a variation in an opening degree of the low pressure EGR valve in the full open position of the low pressure EGR valve.

3. The low pressure EGR apparatus according to claim 1, wherein:
the valve side stopper is placed to oppose the driven plate; and
the valve side stopper contacts the driven plate to stop rotation of the low pressure EGR valve at the time of rotating the low pressure EGR valve from the full close position of the low pressure EGR valve in the opening direction for opening the low pressure EGR passage in a state where the driven plate contacts the throttle valve side stopper to stop the throttle valve at the predetermined rotational position.

4. The low pressure EGR apparatus according to claim 2, wherein:
the throttle valve side stopper is placed to oppose the driven plate in a rotational direction of the driven plate for rotating the driven plate integrally with the throttle valve through urging of the throttle valve with the spring; and
the throttle valve stops at the predetermined rotational position when the driven plate contacts the throttle valve side stopper.

5. The low pressure EGR apparatus according to claim 2, wherein:
the cam mechanism includes:
- a cam groove that is formed in the drive plate; and
- a roller that is provided in the driven plate and moves along the cam groove in response to rotation of the drive plate; and the insensitive zone is set by a portion of a cam profile of the cam groove, which is formed by an arc that has a constant length from a rotational center of the drive plate.

6. The low pressure EGR apparatus according to claim 1, wherein the predetermined rotational position, at which the rotation of the throttle valve is stopped by the throttle valve side stopper at a time of setting the failure mode, is between a full close position of the throttle valve, at which the opening degree of the throttle valve is minimum, and a full open position of the throttle valve, at which the opening degree of the throttle valve is maximum.

7. The low pressure EGR apparatus according to claim 1, wherein the valve side stopper mechanically stops the rotation of the low pressure EGR valve when the low pressure EGR valve is rotated from the full close position of the low pressure EGR valve toward the full open position of the low pressure EGR valve in a state where the throttle valve is kept stopped by the throttle valve side stopper.

8. The low pressure EGR apparatus according to claim 2, wherein:
the valve side stopper is placed to oppose the driven plate; and
the valve side stopper contacts the driven plate to stop rotation of the low pressure EGR valve at the time of rotating the low pressure EGR valve from the full close position of the low pressure EGR valve in the opening direction for opening the low pressure EGR passage in a state where the driven plate contacts the throttle valve side stopper to stop the throttle valve at the predetermined rotational position.

9. The low pressure EGR apparatus according to claim 2, wherein the predetermined rotational position, at which the rotation of the throttle valve is stopped by the throttle valve side stopper at a time of setting the failure mode, is between a full close position of the throttle valve, at which the opening degree of the throttle valve is minimum, and a full open position of the throttle valve, at which the opening degree of the throttle valve is maximum.

10. The low pressure EGR apparatus according to claim 2, wherein the valve side stopper mechanically stops the rotation of the low pressure EGR valve when the low pressure EGR valve is rotated from the full close position of the low pressure EGR valve toward the full open position of the low pressure EGR valve in a state where the throttle valve is kept stopped by the throttle valve side stopper.

* * * * *